Oct. 24, 1933.　　　　　J. H. BROWNE　　　　　1,932,302

ADJUSTABLE TIRE VULCANIZING STAND

Filed July 29, 1932　　　4 Sheets-Sheet 2

James H. Browne
INVENTOR

BY Victor J. Evans & Co.
ATTORNEYS

Oct. 24, 1933.  J. H. BROWNE  1,932,302

ADJUSTABLE TIRE VULCANIZING STAND

Filed July 29, 1932  4 Sheets—Sheet 3

James H. Browne
INVENTOR
BY Victor J. Evans & Co.
ATTORNEYS

Oct. 24, 1933.    J. H. BROWNE    1,932,302
ADJUSTABLE TIRE VULCANIZING STAND
Filed July 29, 1932    4 Sheets-Sheet 4

James H. Browne
INVENTOR
BY Victor J. Evans & Co.
ATTORNEYS

Patented Oct. 24, 1933

1,932,302

UNITED STATES PATENT OFFICE 1,932,302

ADJUSTABLE TIRE VULCANIZING STAND

James H. Browne, East Liverpool, Ohio

Application July 29, 1932. Serial No. 625,900

10 Claims. (Cl. 18—18)

This invention relates to a stand especially adapted for supporting a tire or shoe so that vulcanizing can be easily and quickly accomplished to all portions of the tire or shoe and has for the primary object, the provision of a device of the above stated character, whereby tires of all sizes may be accommodated and supported in such a manner that vulcanizing devices may be easily and quickly applied and removed therefrom and especially vulcanizing pads of the character set forth in my co-pending application, filed July 14, 1931, Serial No. 550,803.

With this and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a vertical sectional view illustrating a stand constructed in accordance with my invention.

Figure 1:
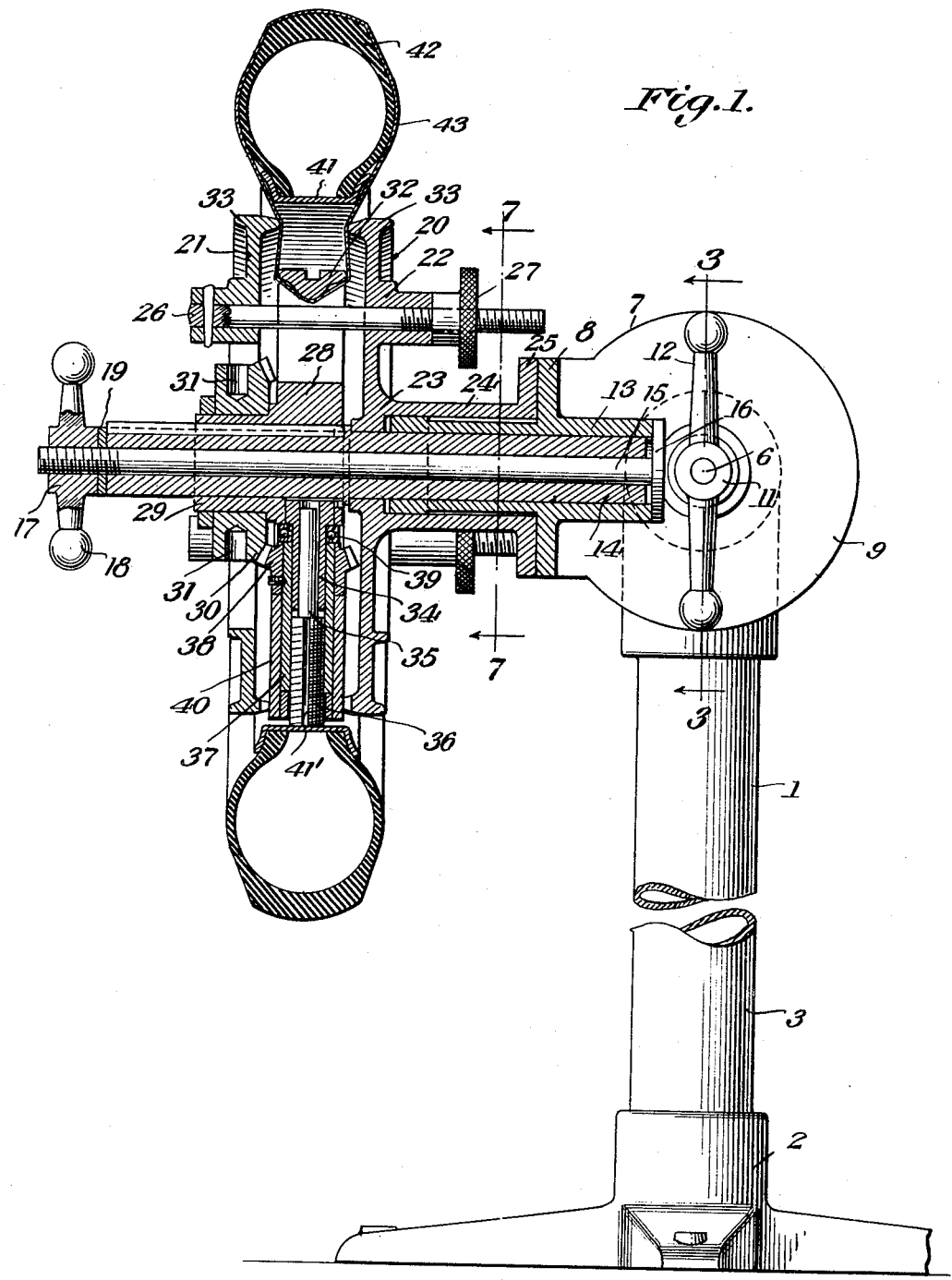
Figure 2:
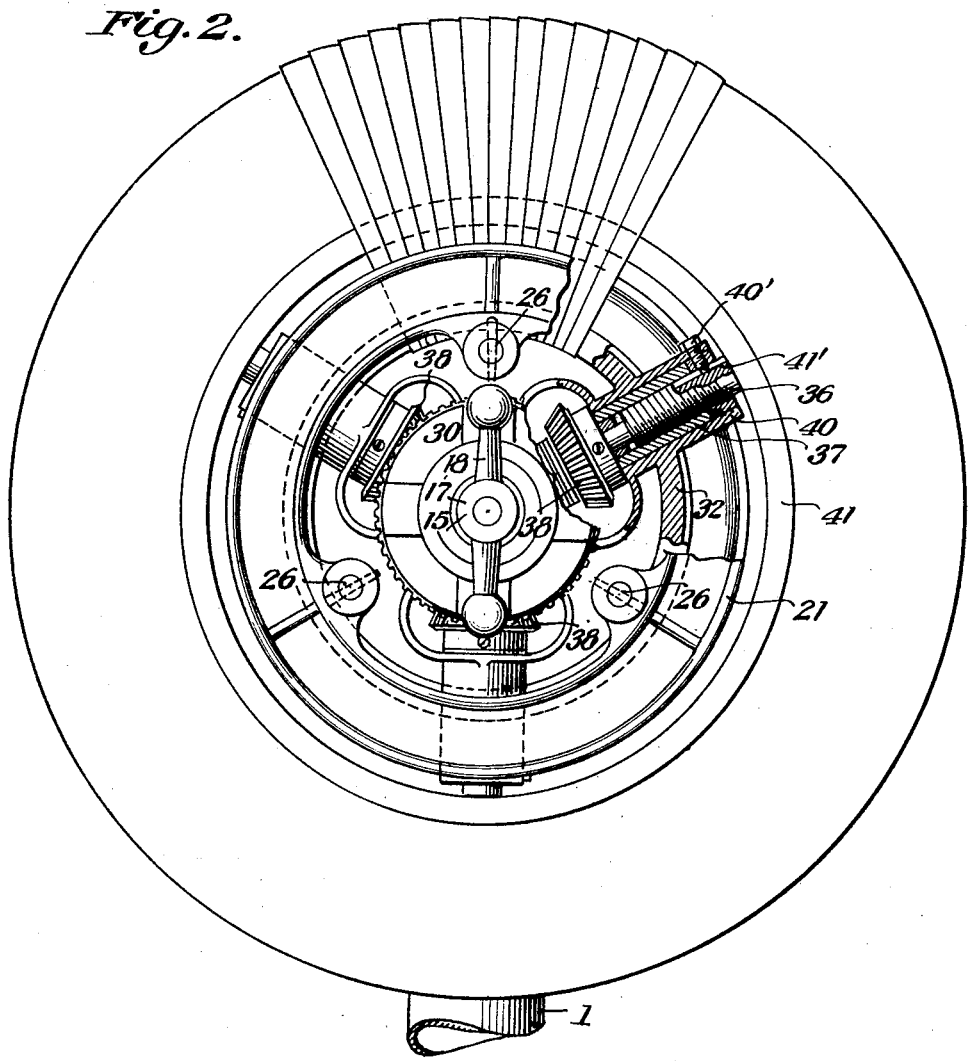
Figure 2 is a fragmentary side elevation partly in section illustrating the same.
Figure 3:
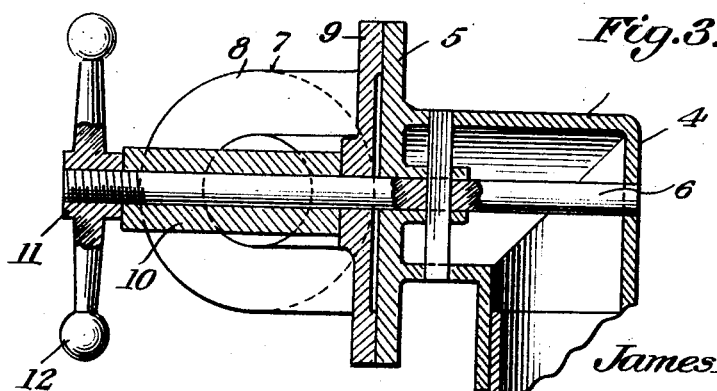
Figure 3 is a sectional view taken on the line 3—3 of Figure 1.

Referring in detail to the drawings, the numeral 1 indicates a pedestal consisting of a base 2 carrying a vertically disposed post 3 to which an L-shaped attaching member 4 is secured and on which is formed a bearing plate 5. A rod 6 is carried by the member 4 and extends through the plate 5 and has journalled thereon a head 7 which consists of angularly related bearing plates 8 and 9. The bearing plate 9 contacts with the bearing plate 5 and is journalled on the rod 6. A spacing sleeve 10 is mounted on the rod 6 with one end against the bearing plate 9 and its other end in engagement with an adjusting nut 11 threaded to the rod. The adjusting nut 11 is provided with handles 12 to facilitate the manipulation thereof. The threading of the nut 11 onto the shaft 6 against the sleeve 10 forces the bearing plate 9 against the bearing plate 5 firmly anchoring the head 7 against movement relative to the pedestal, however, when it is desired to adjust the head 7 relative to the pedestal, the nut 11 is backed off the shaft 6 allowing the bearing plate 9 to turn relative to the bearing plate 5. The head 7 or the bearing plate 8 thereof has formed integrally therewith a bearing sleeve 13 in which is mounted a spindle or sleeve 14 and adapted to have rotation relative thereto. A rod 15 extends through the spindle or sleeve 14 and has a head 16 formed on one end to engage one end of the bearing sleeve 13 while the opposite end of the rod is disposed outwardly of the spindle or sleeve 14 and screw threaded to receive a nut 17 having handles 18. A washer 19 is interposed between the nut 17 and the spindle or sleeve 14 so that on threading the nut 17 in one direction on the rod 15 will cause a securing or locking of the sleeve or spindle 14 to the bearing sleeve 13 and thereby preventing accidental rotation of the spindle or sleeve 14 within its support.

A tire mounting 20 is keyed to the spindle or sleeve 14 and includes annular plates 21 and 22. The plate 22 is provided with a hub portion 23 slidably and rotatably mounted on the spindle or sleeve 14 and has formed integrally therewith a sleeve 24 receiving one end of the bearing sleeve 13 and said sleeve 24 has a bearing plate 25 formed integrally therewith and which contacts with the bearing plate 8 of the head 7. The plate 21 is adjustably supported opposite the plate 22 by rods 26 which are detachably secured to the plate 21 and slidably received in bosses formed on the plate 22 and have threaded thereon nuts 27. The mounting 20 also includes an intermediate supporting member 28 arranged between the plates 21 and 22 and the hub thereof is keyed to the spindle or sleeve 14 and is provided with cut-out portions to permit the rods 26 to extend therethrough and is further provided with a bearing portion 29 on which is journalled an adjusting gear 30 provided with sockets 31 to receive a suitable tool for imparting rotation to the gear in either direction. The intermediate portion 28 is of annular formation and has a peripheral portion 32 arranged inwardly of the outer edges of the plates 21 and 22. Marginal flanges 33 are formed on the plates 21 and 22 and project beyond the inner and outer faces of said plates. The plate 21 is provided with a centrally located opening to permit free operation of the gear 30.

The intermediate portion 28 of the mounting 20 is provided with a plurality of radially extending bearing sleeves 34 in which is slidably mounted rim engaging members 35 having screw threaded portions 36 meshing with screw threads on the interior of adjusting sleeves 37 journalled on the bearing sleeves 34 and to which are secured pinions 38 meshing with the adjusting gear 30. Anti-friction bearings 39 are interposed between the adjusting sleeves 37 and the bearing sleeves 34 and also the hubs of the gears 38. Outer sleeves 40 are carried by the intermediate mounting 28 with the adjusting sleeves 37 journalled therein so that the rim engaging elements 35 may be moved inwardly and outwardly by adjusting or rotating the gear 30 for the purpose of engaging tire rims 41 of different sizes. Set bolts 40' are carried by the outer sleeves 40 and engage in grooves 41' of the tire engaging elements 35 to prevent rotation of said elements 35 during their inward and outward movements. The tire engaging elements 35 are adapted to be moved outwardly into engagement with the inner faces of the tire rim by adjusting or rotating the gear 30 so that the tire 42 supported by the rim will be positioned outwardly of the peripheries of the plates 21 and 22 whereby vulcanizing wrappings 43 may be placed about the tire 42 and about the annular portion 32 of the intermediate portion 28 of the mounting and by adjusting the plates 21 and 22 toward each other, the tautness of the wrapping may be increased and decreased as desired.

Figure 4:
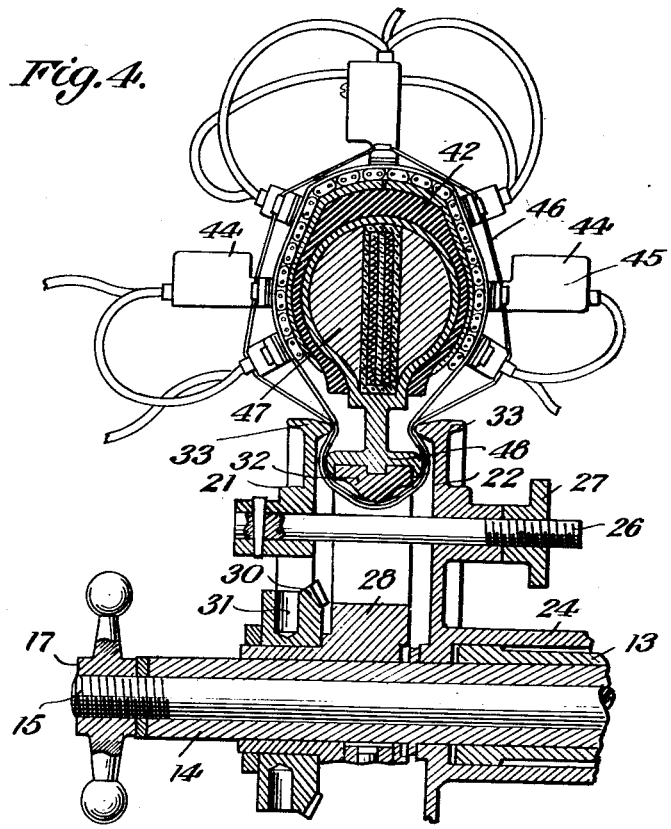
Figure 4 is a fragmentary sectional view illustrating a tire supported by the stand and vulcanized by heating pads and an electrically heated core carried by the stand.
Figure 5:
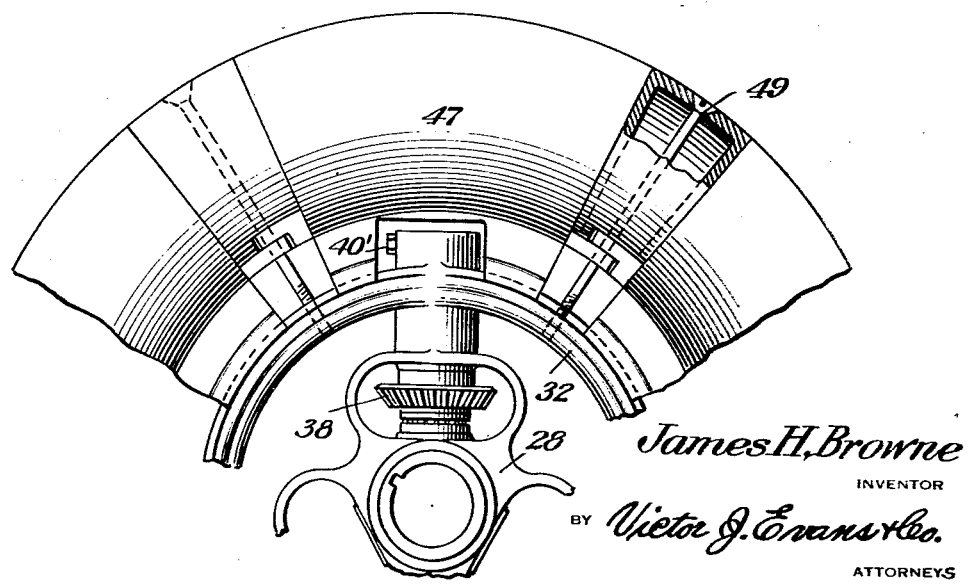
Figure 5 is a fragmentary side elevation partly in section illustrating the mounting of the core on the stand.

Vulcanizing devices or pads 44 may be arranged about the tire 42 as shown in Figure 4 and these vulcanizing devices or pads form the subject-matter of the co-pending application heretofore referred to and as shown in Figure 4 they are arranged to vulcanize the tire from bead to bead, however, it is to be understood that the tread of the tire may be vulcanized without vulcanizing the walls when desired by reducing the number of heating elements 45 of the vulcanizing devices. To retain the vulcanizing devices or pads on the tire as shown in Figure 4 wrappings 46 are passed about the vulcanizing devices and between the plates 21 and 22 and about the annular portion 28 of the intermediate portion 28 of the mounting 20.

Electrically heated sectional cores 47 may be arranged within the tire 42 and are detachably secured to the annular portion of the intermediate portion 28 of the mounting as shown at 48. The sections of the electrical heating core 47 are detachably connected by thread rods 49 which are threaded into the annular portion 32 of the mounting.

Figure 6:
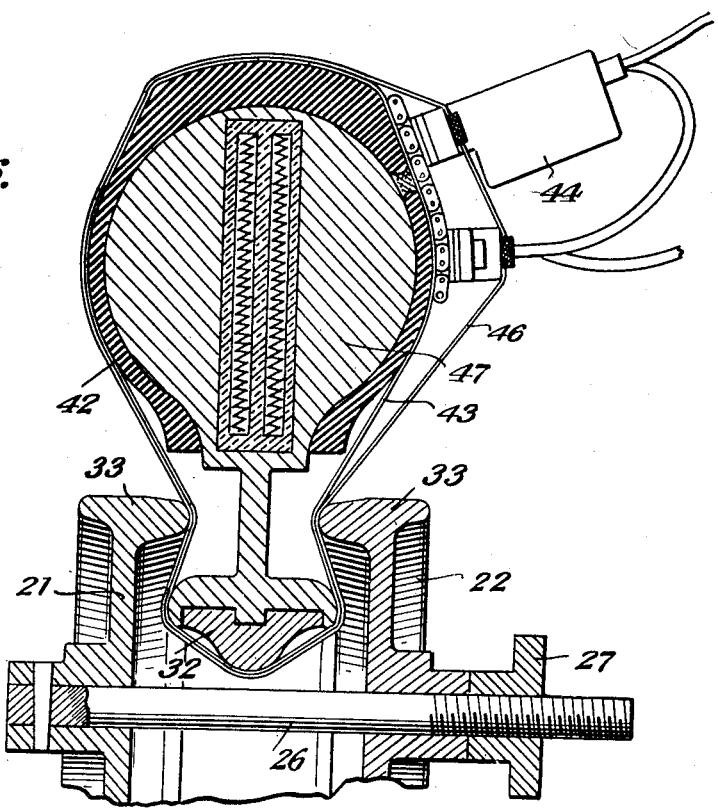
Figure 6 is a fragmentary sectional view showing the tire mounted on the stand and having an injured portion thereof vulcanized by a heating pad.
Figure 7:
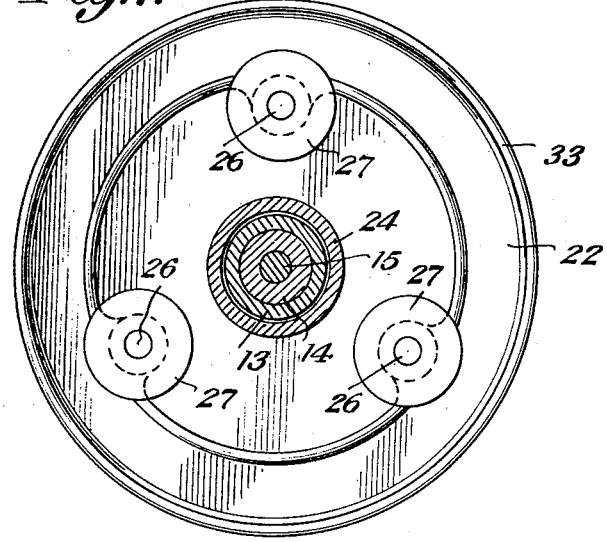
Figure 7 is a sectional view taken on the line 7—7 of Figure 1.
Figure 8:
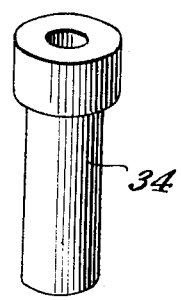
Figure 8 is a perspective view illustrating a supporting sleeve for one of the adjustable rim engaging elements of the stand.

As shown in Figure 6 the vulcanizing pad or device is employed for curing the rubberized material employed for closing an opening formed in the tire or shoe by a puncture.

When employing the electrically heated core, the ordinary tire rim 41 is dispensed with, as the core forms a support for the tire 42 as clearly shown in Figure 4.

From the foregoing description taken in connection with the accompanying drawings, it will be seen that a stand of this character will permit the tire to be rotated with the mounting therefor relative to the pedestal of the stand and also that the mounting may be adjusted as to inclinations relative to the pedestal and further that the mounting may be readily adjusted to accommodate rims and tires of different sizes and that the tire may be heated both on the exterior and interior thereof. Further it is to be noted that it is possible to vulcanize the entire tire or any portions thereof by the employment of heating pads forming the subject-matter of my co-pending application and by the employment of the electrically heated core.

While I have shown and described the preferred embodiment of my invention, it will be understood that minor changes in construction, combination and arrangement of parts may be made without departing from the spirit and scope of my invention, as claimed.

Having thus described my invention, what I claim is:—

1. A stand comprising a pedestal, a supporting means adjustably secured to the pedestal and capable of adjustment at various inclinations relative to the pedestal, an adjustable tire mounting journalled on said means, and means for securing said tire mounting against rotation relative to said first means.

2. A stand comprising a vertically disposed pedestal, a supporting arm adjustably secured to the pedestal and capable of being adjusted at various inclinations to said pedestal, an adjustable tire mounting rotatably mounted on said arm, and means for securing said mounting against rotation.

3. A stand comprising an adjustable supporting structure, an intermediate member carried by said supporting structure, adjustable means on said intermediate member to support tires of different sizes thereon, and means carried by the intermediate member to engage vulcanizing wrappings of the tire for increasing and decreasing the tautness thereof.

4. A stand comprising a supporting structure, a tire mounting carried by said structure, said mounting having openings to receive vulcanizing wrapping passing about the tire, a plate carried by said mounting, and a second plate adjustably secured to the first plate to engage the wrapping for varying the tautness thereof.

5. A stand comprising a pedestal, a spindle sleeve rotatably and adjustably secured to said pedestal, means for securing the sleeve against rotation, an intermediate member secured to the sleeve, rim engaging elements carried by said member and extending radially from the sleeve, and means for adjusting said tire engaging elements to accommodate tire rims of different sizes.

6. A stand comprising a pedestal, a sleeve adjustably and rotatably secured to a pedestal, means for securing said sleeve against rotation, an annular mounting on said sleeve, sectional heating cores removably secured to said mounting for supporting a tire, and adjustable means on said mounting to engage vulcanizing wrappings extending about a tire and the mounting for increasing and decreasing the tautness thereof.

7. A stand comprising a pedestal, a sleeve adjustably and rotatably secured to the pedestal, means for securing the sleeve against rotation, an annular mounting secured to the sleeve, radially extending tire engaging elements carried by the mounting to engage the rim of a tire, and means whereby said elements may be adjusted simultaneously to accommodate rims of different sizes.

8. A stand comprising a pedestal, a sleeve rotatably and adjustably secured to the pedestal, means for securing the sleeve against rotation, an annular mounting secured to the sleeve, and means for supporting a tire upon said mounting and outwardly thereof to permit vulcanizing means to be applied to the interior and exterior of the tire.

9. A stand comprising a pedestal, a tire mounting adjustably carried by said pedestal, means whereby tires of different sizes may be secured to said mounting with the tire arranged outwardly of the mounting, vulcanizing means engaging the outer walls of the tire, wrappings securing said vulcanizing means to the tire and extending through the mounting, and adjustable means carried by the mounting to engage said wrappings.

10. A stand comprising a pedestal, a tire mounting adjustably carried by said pedestal, means whereby tires of different sizes may be secured to said mounting with the tire arranged outwardly of the mounting, vulcanizing means engaging the outer walls of the tire, wrappings securing said vulcanizing means to the tire and extending through the mounting, adjustable means carried by the mounting to engage said wrappings, and a sectional vulcanizing core in the tire and supported by said mounting.

JAMES H. BROWNE.